(12) United States Patent
Xu et al.

(10) Patent No.: US 8,724,711 B2
(45) Date of Patent: May 13, 2014

(54) LUMA-BASED CHROMA INTRA PREDICTION

(75) Inventors: Lidong Xu, Beijing (CN); Yu Han, Beijing (CN); Yi-Jen Chiu, San Jose, CA (US); Wenhao Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/512,992

(22) PCT Filed: Jul. 12, 2011

(86) PCT No.: PCT/CN2011/001150
§ 371 (c)(1),
(2), (4) Date: May 31, 2012

(87) PCT Pub. No.: WO2013/006986
PCT Pub. Date: Jan. 17, 2013

(65) Prior Publication Data
US 2013/0136174 A1    May 30, 2013

(51) Int. Cl.
*H04N 7/12*    (2006.01)
(52) U.S. Cl.
USPC ................................. 375/240.25
(58) Field of Classification Search
USPC ................................. 375/240.25
See application file for complete search history.

(56) References Cited

U.S. PATENT DOCUMENTS

| | | | |
|---|---|---|---|
| 2006/0029135 A1 | 2/2006 | Zhou et al. | |
| 2008/0192145 A1 | 8/2008 | Lee et al. | |
| 2011/0255591 A1* | 10/2011 | Kim et al. | 375/240.02 |
| 2012/0287995 A1* | 11/2012 | Budagavi | 375/240.12 |

FOREIGN PATENT DOCUMENTS

| | | |
|---|---|---|
| CN | 101494792 A | 7/2009 |
| CN | 101902653 A | 12/2010 |
| CN | 101964906 A | 2/2011 |
| CN | 102006481 A | 4/2011 |
| WO | 20111081637 A1 | 7/2011 |

OTHER PUBLICATIONS

Lan, et al., "Intra Frame Coding With Template Matching Prediction and Adaptive Transform", Proceedings of 2010, IEEE 17th International Conference on Image Processing, Sep. 26-29, 2010, pp. 1221-1224.

Lucas, et al., "Intra-Prediction for Color Image Coding Using Yuv Correlation", Proceedings of 2010, IEEE 17th International Conference on Image Processing, Sep. 26-29, 2010, pp. 1329-1332.

International Search Report and Written Opinion Received for PCT Application No. PCT/CN2011/001150, Mailed on Apr. 19, 2012, 9 pages.

* cited by examiner

*Primary Examiner* — Anner Holder
(74) *Attorney, Agent, or Firm* — Lynch Law Patent Group, P.C.

(57) ABSTRACT

Systems, devices and methods for performing luma-based chroma ultra prediction are described. Down-sample filters may be applied to luma values of luma pixel positions to generate reconstructed luma values for chroma pixel positions in a prediction unit of an intra frame. The down-sampled reconstructed luma values may then be used to predict chroma values for the chroma pixel positions. In some implementations, a reconstructed luma value of a chroma position may be used to predict that position's chroma value. In other implementations, reconstructed luma values of neighboring chroma pixel positions may be analyzed to adaptively predict a chroma value for a chroma pixel position.

36 Claims, 9 Drawing Sheets

LUMA-BASED CHROMA INTRA PREDICTION

BACKGROUND

In video coding, intra coded frames are encoded without dependency on other frames allowing these frames to be decoded independently and to be used, for example, as random access points for fast forward and fast rewind video play. An image frame or picture, such as an intra coded frame, may be coded in units of a Largest Coding Unit (LCU). A LCU may be a 128×128 block of pixels, a 64×64 block, a 32×32 block or a 16×16 block. An LCU may be encoded directly or may be divided into four smaller Coding Units (CUs). In turn, a CU may be encoded directly or may be further sub-divided. The smallest CU typically corresponds to an 8×8 block of pixels or pixel positions.

To facilitate the prediction of pixel values, each CU of size 2N×2N may be divided into different sized Prediction Units (PUs) in which pixel values may be intra predicted based on other pixel values in neighboring PUs in the same frame or picture. For intra coding, a 2N×2N CU may be encoded in one 2N×2N PU or in four N×N PUs. For example, a 32×32 LCU may be divided into four 16×16 CUs each of which may, in turn, be divided into four 8×8 PUs for the purposes of intra prediction. In addition, for color pictures, such as pictures coded in a YUV 4:2:0 format, an 8×8 PU may correspond to one 8×8 luma block Y and two smaller 4×4 chroma blocks U and V.

Typically, luma and chroma blocks are intra predicted independently of each other. Thus, conventionally, luma pixel values are predicted from reconstructed luma pixel values of neighboring PUs, while chroma pixel values are predicted from the reconstructed chroma pixel values of neighboring PUs. However, the information contained in luma and chroma blocks of a PU may not be completely independent as they may exhibit similar structural features such as object textures, and so forth. What are needed are techniques for leveraging similarities between luma and chroma blocks to aid in pixel prediction during encoding and/or decoding processes.

BRIEF DESCRIPTION OF THE DRAWINGS/FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
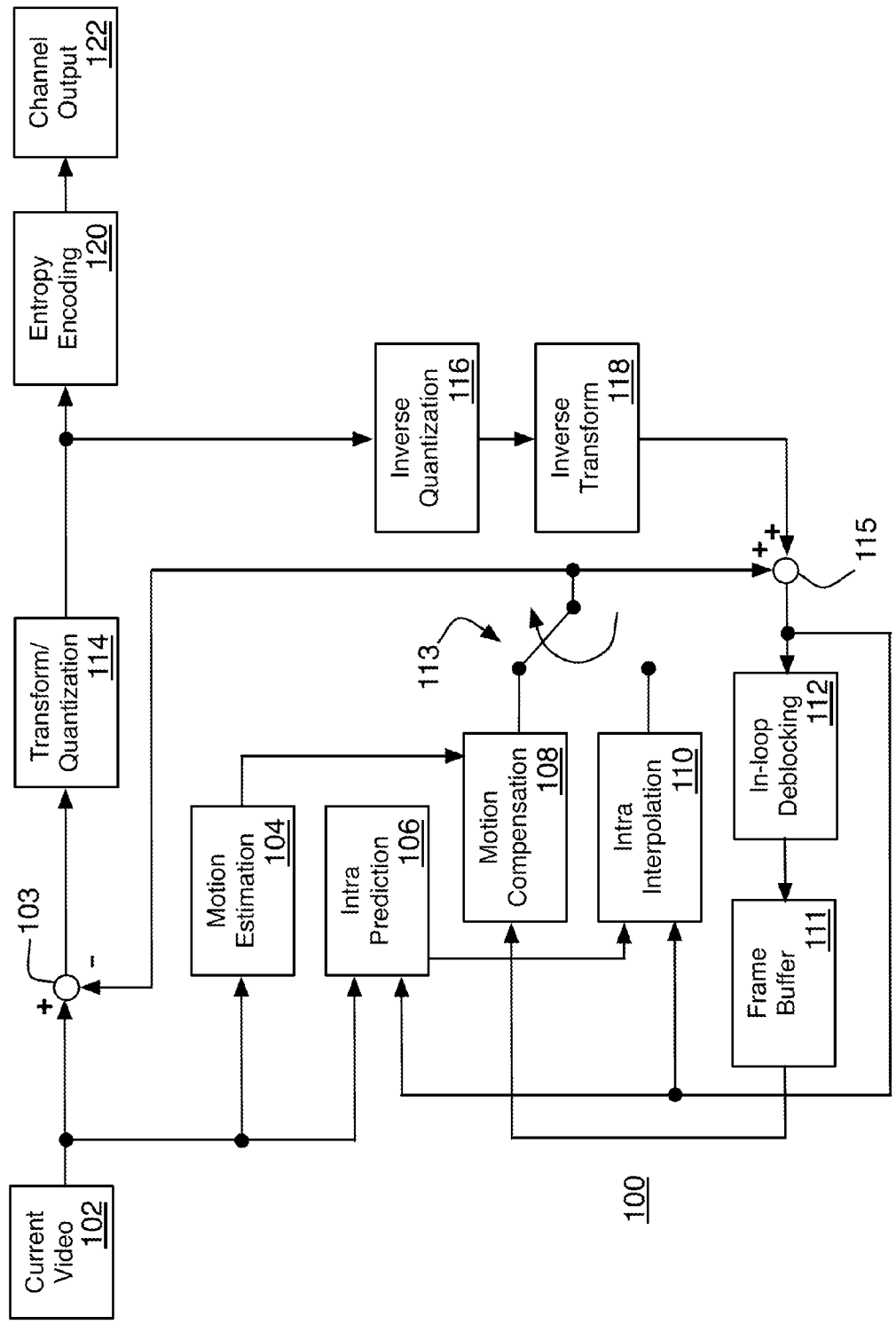
FIG. 1 is an illustrative diagram of an example video encoder system.

One or more embodiments are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may implemented by any execution environment for similar purposes. For example, various architectures, for example architectures employing multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation or embodiment described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementation whether or not explicitly described.

Material described herein may be implemented in the context of a video encoder/decoder system that undertakes video compression and/or decompression. FIG. 1 illustrates an example video encoder 100 including an intra prediction module 106 in accordance with the present disclosure. Encoder 100 may, at least in part, implement one or more advanced video codec standards, such as, for example, the ITU-T H.264 standard, published March 2003. Current video information may be provided from a current video block 102 in the form of a plurality of frames of video data. The current video may be passed to a differencing unit 103. The differencing unit 103 may be part of a Differential Pulse Code Modulation (DPCM) (also called the core video encoding) loop, which may include a motion compensation (MC) module 108 and a motion estimation (ME) module 104. The loop may also include intra prediction module 106, an intra interpolation module 110, and a frame buffer 111. In some cases, an in-loop deblocking filter 112 may also be used in the DPCM loop.

The current video may be provided to the differencing unit 103 and to the ME module 104. The MC module 108 or the intra interpolation module 110 may produce an output through a switch 113 that may then be subtracted from the current video 102 to produce a residual. The residual may then be transformed and quantized at transform/quantization stage 114 and subjected to entropy encoding in module 120 to provide a channel output 122 such as an encoded bitstream.

The output of motion compensation stage 108 or intra-interpolation stage 110 may be provided to a summer 115 that may also receive an input from an inverse quantization unit 116 and inverse transform unit 118. The inverse quantization unit 116 and inverse transform unit 118 may provide dequantized and detransformed information back to the DPCM loop.

Intra prediction module 106 may implement, at least in part, the various luma-based chroma intra prediction schemes described herein. For instance, as will be described in greater detail below, intra prediction module 106 may determine and/or specify, at least in part, information including intra prediction data and/or parameters such as what PUs, or portions thereof, are to be subjected to luma-based chroma intra prediction schemes, what luma-based chroma intra prediction scheme is to be applied, what luma down-sampling filter (s) are to be employed, what corresponding filter coefficients are to be used, and so forth. Intra prediction module 106 may convey such information in one or more bitstream headers provided as part of channel output 122 and to be used by a compatible decoder to implement luma-based chroma intra prediction schemes in accordance with the present disclosure.

Figure 2:
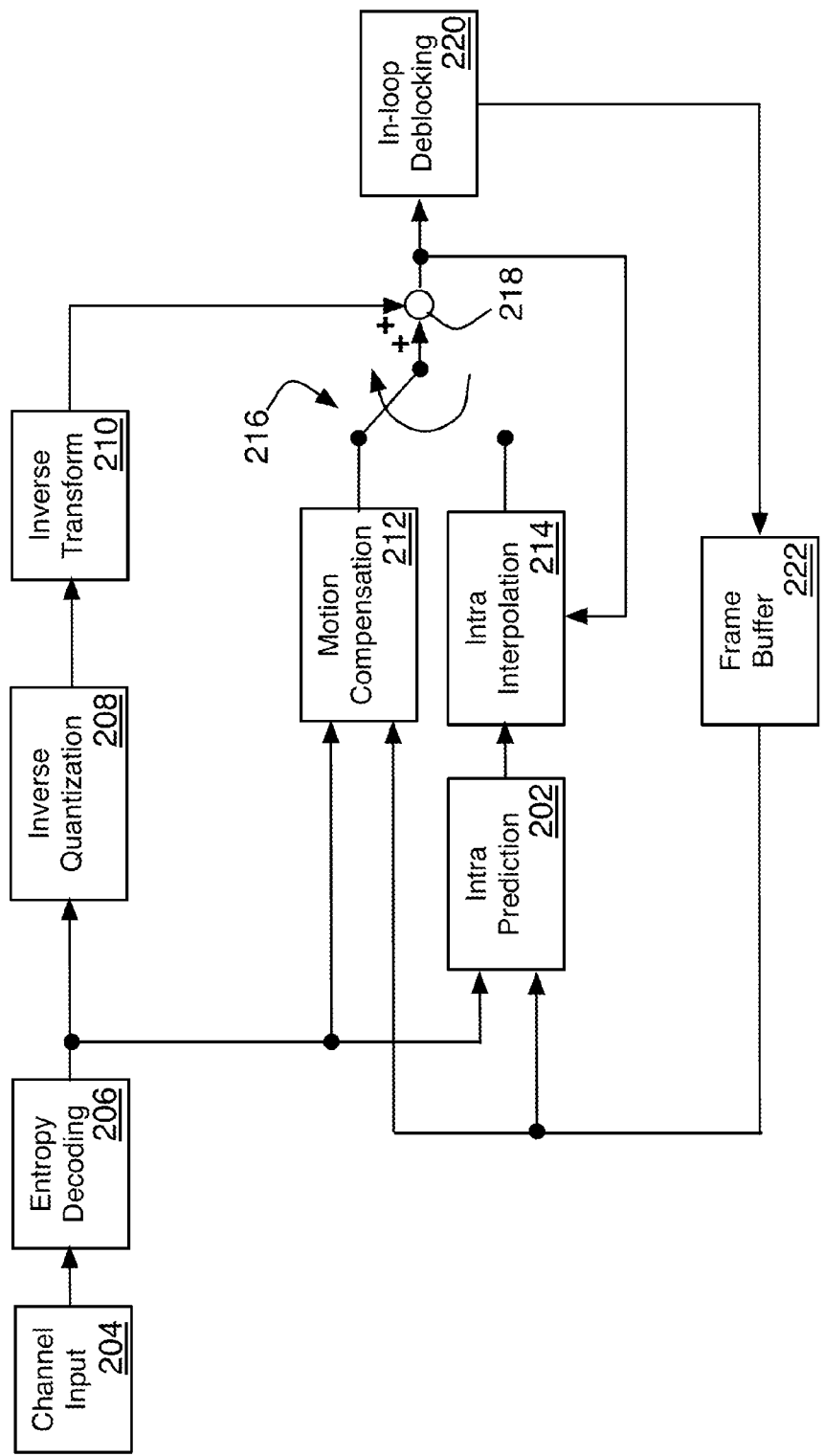
FIG. 2 is an illustrative diagram of an example video decoder system.

FIG. 2 illustrates a video decoder 200 including an ultra prediction module 202 in accordance with the present disclosure. Decoder 200 may implement one or more advanced video codec standards, such as, for example, the H.264 standard. Decoder 200 may include a channel input 204 coupled to an entropy decoding module 206. Channel input 204 may receive input from the channel output of an encoder such as encoder 100 of FIG. 1. In various implementations, the channel output received at input 204 may include an encoded bitstream having one or more bitstream headers conveying intra prediction data and/or parameters suitable for configuring decoder 200 to implement luma-based chroma intra prediction schemes in accordance with the present disclosure.

Output from decoding module 206 may be provided to an inverse quantization module 208 and the output of module 208 may be provided to an inverse transform module 210. The output from decoding module 206 may also be provided to an intra prediction module 202 and to a motion compensation (MC) module 212. The output of intra prediction module 202 may be provided to an intra interpolation module 214, which may feed a selector switch 216. Information from inverse transform module 210, and either MC module 212 or intra interpolation module 214 as selected by the switch 216, may then be summed 218 and provided to an in-loop de-blocking module 220 and fed back to intra interpolation module 214. The output of the in-loop deblocking module 220 may then be provided to a frame buffer 222 and thence to intra prediction module 202 and MC module 212.

Intra prediction module 202 may implement, at least in part, the various luma-based chroma intra prediction schemes described herein. In various implementations, intra prediction module 202 may be synchronized and/or coordinated with intra prediction module 106 of encoder 100 of FIG. 1 as will be explained in greater detail below. In accordance with the present disclosure, intra prediction module 106 of encoder 100 may be used to determine various intra prediction data and/or parameters suitable for use by intra prediction module 202 of decoder 200 in undertaking luma-based chroma intra prediction schemes to be described in further detail below. For instance, encoder 100 may provide such intra prediction data and/or parameters in the form of one or more bitstream headers included in channel output 112 and received by channel input 204. Further, in various configurations, encoder 100 and decoder 200, and corresponding intra prediction modules 106 and 202, may be implemented in a generic video codec architecture, and are not limited to any specific coding architecture such as the H.264 coding architecture.

Encoder 100 and decoder 200, and the processing performed by them as described herein, may be implemented in hardware, firmware, or software, or any combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 3:
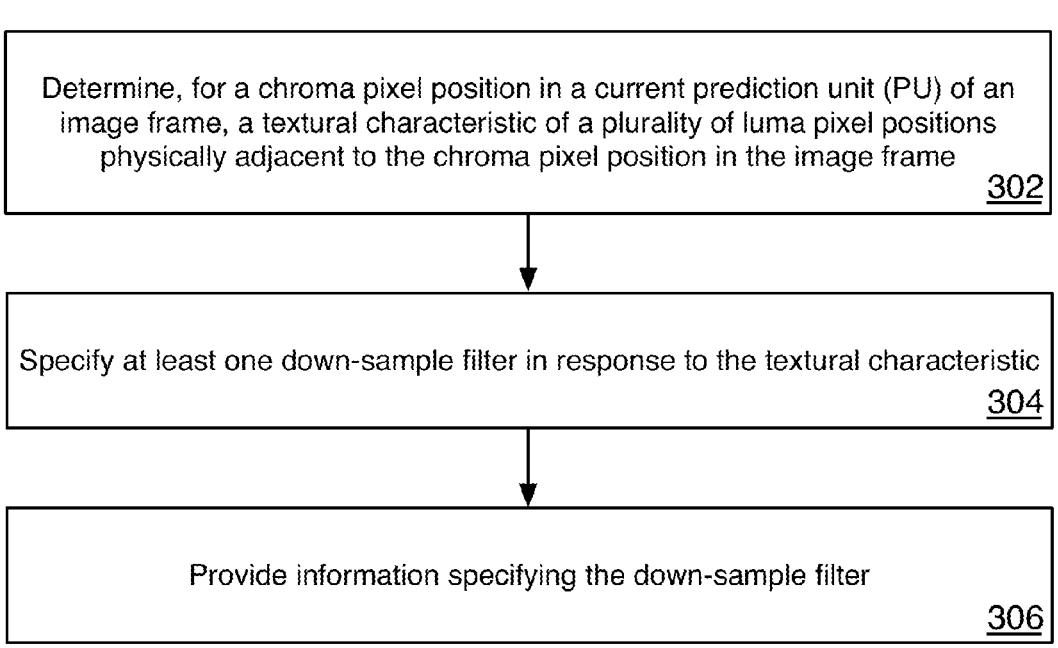
FIG. 3 is a diagram illustrating an example process.

FIG. 3 illustrates a flow diagram of an example process 300 in accordance with various implementations of the present disclosure. Process 300 may include one or more operations, functions or actions as illustrated by one or more of blocks 302, 304, and/or 306. In various implementations, process 300 may be undertaken at a video encoder such as, for example, encoder 100 of FIG. 1.

Process 300 may begin at block 302 where, for a chroma pixel position in a current prediction unit (PU) of an image frame, a textural characteristic may be determined for a plurality of luma pixel positions physically adjacent to the chroma pixel position in the image frame. For example, in various implementations, block 302 may involve encoder 100 using intra prediction module 106 to analyze a textural characteristic of luma pixel positions neighboring to a chroma pixel position of an intra coded frame, where a decoder, such as decoder 200 of FIG. 2, may later predict a chroma value for that chroma pixel position as will be explained in greater detail below. In various non-limiting examples the textural characteristic determined at block 302 may include characterizing a group of luma pixel positions adjacent to a chroma pixel position as exhibiting a smooth textural characteristic (e.g., as being without significant edges) or as having one or more edges oriented in various directions with respect to the chroma pixel position.

Figure 4:
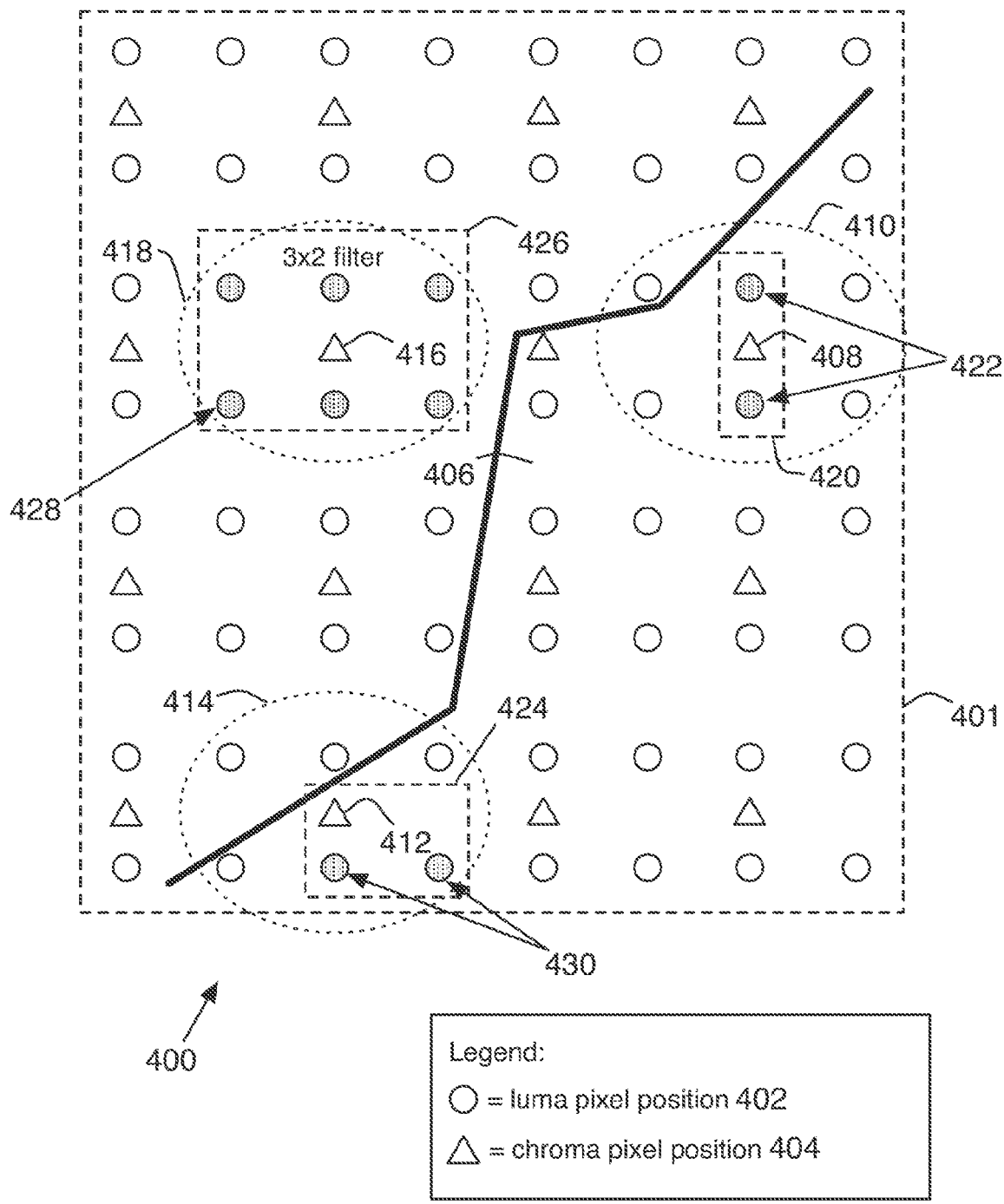
FIG. 4 is a diagram illustrating an example intra prediction scheme.

FIG. 4 illustrates an example intra prediction scheme 400 for a 8×8 PU 401 having a YUV 4:2:0 format where luma pixel positions and chroma pixel positions of PU 401 are illustrated as circles 402 and triangles 404, respectively. When subjected to processing as described herein, a PU, such as PU 401 may be described as a current PU. Example PU 401 includes an image edge 406 where luma positions 402 on either side of edge 406 may have substantially different luma values. In this example, when intra prediction module 106 undertakes block 302 for a luma position 408 located adjacent to edge 406, module 106 may analyze the textural structure of the luma values of a group 410 of luma pixel positions neighboring or adjacent to luma position 408 and may identify edge 406 as a textural characteristic associated with luma position 408. In various implementations, module 106 may do so by subjecting the luma values of group 410 to well known edge detection processing techniques such as, for example, applying a Sobel filter to group 410. For other example chroma pixel positions 412 and 416 in PU 401, module 106 may likewise analyze luma values of groups 414 and 418, respectively to determine corresponding textural characteristics for those chroma pixel positions. In this example, when analyzing group 418, module 106 may determine that chroma position 416 is not adjacent to edge 406 and thus has a smooth textural characteristic.

While FIG. 4 illustrates an example intra prediction scheme 400 in accordance with various implementations, intra prediction scheme in accordance with the present disclosure are not limited to the various sizes, quantities and particular arrangements of items and/or structures depicted in scheme 400 or other schemes described herein. Thus, for example, the present disclosure is not limited to particular sizes of PUs, particular image formats (e.g., YUV4:2:0, YUV4:2:2, etc.), orientation of chroma positions with respect to luma positions, size, shape and orientation of down-sample filters, and so forth. For instance, while FIG. 4 illustrates groups 410, 414 and 418 as encompassing only nearest neighbor luma positions, in various implementations groups 410, 414 and 418 may have any shapes and/or encompass any number of adjacent luma positions including next nearest neighbor luma positions and so forth. Further, groups 410, 414 and 418 may have any orientation with respect to the associated luma position.

Returning to discussion of FIG. 3, process 300 may continue at block 304 with the specification of at least one down-sample filter in response to the textural characteristic determined at block 302. For example, in various implementations, block 304 may involve encoder 100 using intra prediction module 106 to specify a down-sample filter based on any edges detected in the vicinity of the chroma pixel position where that down-filter may be used by a decoder, such as decoder 200 of FIG. 2, to generate a reconstructed luma value for the chroma pixel position as will be explained in greater detail below. In various implementations, the down-filter specified in block 304 may be selected from a predetermined set of down-sample filters having various sizes N×M, where N and M specify the number of columns and rows of pixels, respectively, spanned by a down-sample filter. For example, a predetermined set of down-sample filters may include filters of size 1×2, 2×1, 2×2, 3×1, 1×3 3×2, 2×3, and 3×3.

Referring again to FIG. 4, subsequent to having detected edge 406 at block 302, intra prediction module 106 may undertake block 304 for chroma pixel position 408 by specifying a 1×2 filter 420. As will be explained in greater detail below, filter 420 may be used by a decoder to reconstruct a luma value for chroma position 408 based on the luma values of the two luma pixel positions 422 (illustrated by darkened circles in FIG. 4) spanned by filter 420. Similarly, for chroma pixel position 412, block 304 may involve module 106 specifying a directional 2×1 filter 424 oriented to the lower right hand side of chroma position 412 as shown. A decoder may then apply down-sample filter 424 when undertaking intra prediction processing of chroma position 412. In another non-limiting example, block 304 may involve module 106 specifying a 3×2 down-sample filter 426 for chroma pixel position 416 based on the analysis undertaken at block 302 that determined a smooth characteristic for the luma values of group 418.

In various implementations, down-sample filters may generate a down-sampled luma pixel value as a weighted average of the surrounding luma pixels. Further, different weighting factors or coefficient values for down-sample filters may be employed for different luma pixel positions. In various implementations, block 304 may also include specifying weighting factors or coefficient values for the down-sample filter.

Process 300 may conclude at block 306 with the provision of information specifying the down-sample filter specified at block 304. In various implementations, block 306 may include an encoder providing data in one or more headers of a video bitstream specifying the size of the down-sample filter specified at block 304. For instance, encoder 100 may provide a bitstream via channel output 122 where the bitstream includes header information about the down-sample filters specified for various chroma pixel positions of a PU by module 106. As noted above, the bitstream provided by encoder 100 may also specify coefficient values associated with the various down-sample filters. While FIG. 3 illustrates a particular arrangement of blocks 302, 304, and 306, the present disclosure is not limited in this regard and processes for luma-based chroma intra prediction according to various implementations of the present disclosure may include other arrangements.

Figure 5:
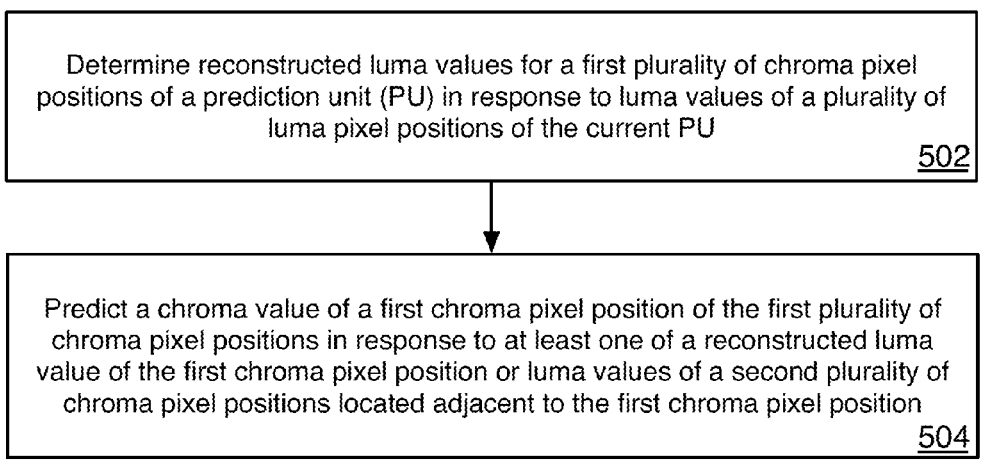
FIG. 5 is a diagram illustrating an example process.

FIG. 5 illustrates a flow diagram of an example process 500 in accordance with various implementations of the present disclosure. Process 500 may include one or more operations, functions or actions as illustrated by one or more of blocks 502 and/or 504. In various implementations, process 500 may be undertaken at a video decoder such as, for example, decoder 200 of FIG. 2. While FIG. 5 illustrates a particular arrangement of blocks 502 and 504, the present disclosure is not limited in this regard and processes for luma-based chroma intra prediction according to various implementations of the present disclosure may include other arrangements.

Process 500 may begin at block 502 where luma values of a group of chroma pixel positions may be reconstructed in response to luma values of a group of luma pixel positions. For example, in various implementations, block 502 may involve intra prediction module 202 of decoder 200 applying a down-sample filter to luma values of luma pixel positions neighboring a chroma pixel position to generate or predict a reconstructed luma value for that chroma pixel position. As noted above, an encoder may provide information in one or more bitstream headers specifying down-sample filters and/or down-sample filter coefficient or weighting values. Decoder 200 may receive the bitstream from an encoder, such as encoder 100, at channel input 204 and may employ the header information when undertaking block 502.

For example, referring again to FIG. 4, block 502 may involve intra prediction module 202 using 3×2 filter 426 to generate a reconstructed luma value for chroma pixel position 416. Similarly, when undertaking block 302, decoder 200 may apply 1×2 filter 420 and 2×1 filter 424 to generate reconstructed luma values for chroma pixel positions 408 and 412, respectively. Hence, in the example of FIG. 4, block 302 may involve generating a reconstructed luma value for chroma pixel position 416 based on the luma values of the six luma pixel positions 428 of group 418, and reconstructed luma values for chroma pixel positions 408 and 412 based on the luma values of the pairs of luma pixel positions 422 and 430, respectively.

Figure 6:
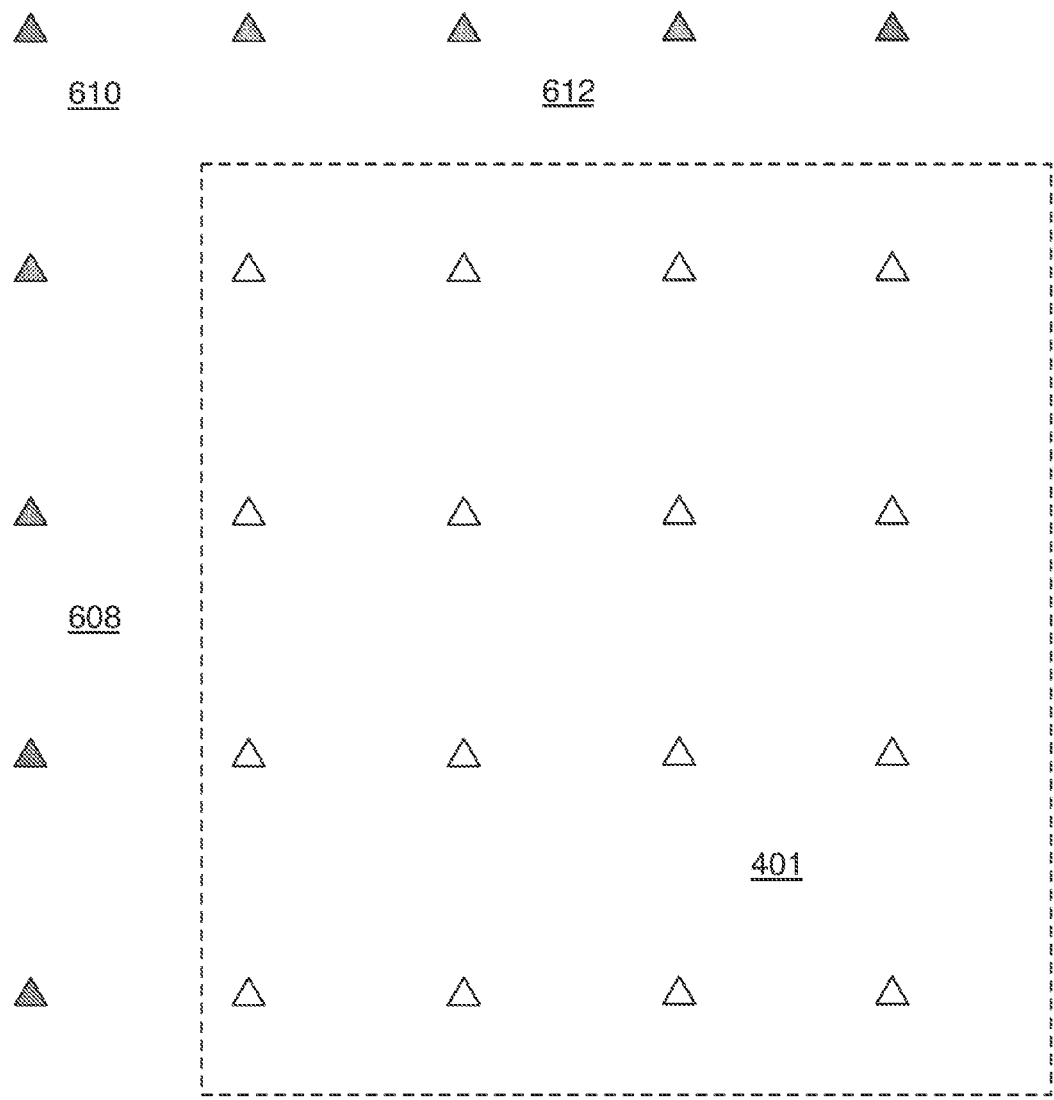
FIG. 6 is a diagram illustrating an example intra prediction scheme.

FIG. 6 illustrates an example intra prediction scheme 600 for example PU 401 of FIG. 6 subsequent to processing at block 502 for all chroma pixel positions 604 of PU 401. As shown in scheme 600, subsequent to processing at block 502, each chroma pixel position 604 (illustrated by open triangles) in PU 401 will have a reconstructed luma value generated (at block 502) from the luma values of adjacent luma pixel positions not illustrated in FIG. 6 in the interest of clarity. In addition, as shown in scheme 600, chroma pixel positions 606 (illustrated by darkened triangles) in neighboring PUs may already have reconstructed chroma values as a result of process 500 have been previously undertaken for adjacent PUs 608, 610 and 612.

Returning to FIG. 5, process 500 may conclude at block 504 where a chroma value of a chroma pixel position may be predicted in response to at least one of a reconstructed luma value of the chroma pixel position or luma values of adjacent chroma pixel positions. In various implementations, block 504 may involve intra prediction module 202 of decoder 200 predicting a chroma value for a chroma pixel position in response to either a reconstructed luma value of the chroma pixel position or by undertaking a local analysis of adjacent chroma pixel positions. Decoder 200 may undertake a local analysis of adjacent chroma pixel positions by comparing the reconstructed luma value (generated at block 502) of the chroma pixel position to the reconstructed luma values of the adjacent chroma pixel positions that have been reconstructed by decoder 200, where decoder 200 may implement a raster scan processing order.

In accordance with the present disclosure, predicting a chroma value for a chroma pixel position in response to a reconstructed luma value of the chroma pixel position at block 504 may be implemented in various ways. In some implementations, the reconstructed luma value of the chroma pixel position may be subjected to linear or non-linear transforms. For instance, for a chroma pixel position k, a chroma value C'(k) may be predicted from the luma value L(k) of position k using the following expression $$C'(k) = f(L(k)) \quad (1)$$

where $f(\bullet)$ may be a linear or non-linear function or transform. In various implementations, the parameters of $f(\bullet)$ may be determined using the reconstructed luma and/or chroma values of at least some neighboring chroma pixel positions. In various implementations luma and/or chroma values for the neighboring positions may be used to build a linear or non-linear equation group for $f(\bullet)$. Parameters of $f(\bullet)$ may then be obtained using well known techniques such as, for example, linear least squares, non-linear least squares, weighted least squares or other well known optimization methods.

In general, a linear form of $f(\bullet)$ may be expressed as follows $$C'(k) = a*L(k) + b \quad (2)$$

where L(k) represents a luma value at chroma pixel position k, C'(k) represents the predicted chroma value at position k, and a and b are linear equation parameters.

In general, a non-linear form of $f(\bullet)$ may be expressed as follows $$C'(k) = a(k)*L(k) + b(k) \quad (3)$$

where a(k) and b(k) are non-linear equation parameters. In various implementations, parameters a(k) and b(k) may be determined, at least in part, by the value of L(k). For example, the range of values of L(k) (e.g., [0, 255] for 8-bit video depth) may be divided into M smaller subsets or ranges S(k) of luma values. Each subset S(k) may then be assigned different values for a(k) and b(k) to be used in Eq. (3) so that when the value of L(k) for a particular chroma position lies within a given subset S(k) the corresponding values for a(k) and b(k) are applied to predict the chroma value C'(k) for that position.

Figure 7:
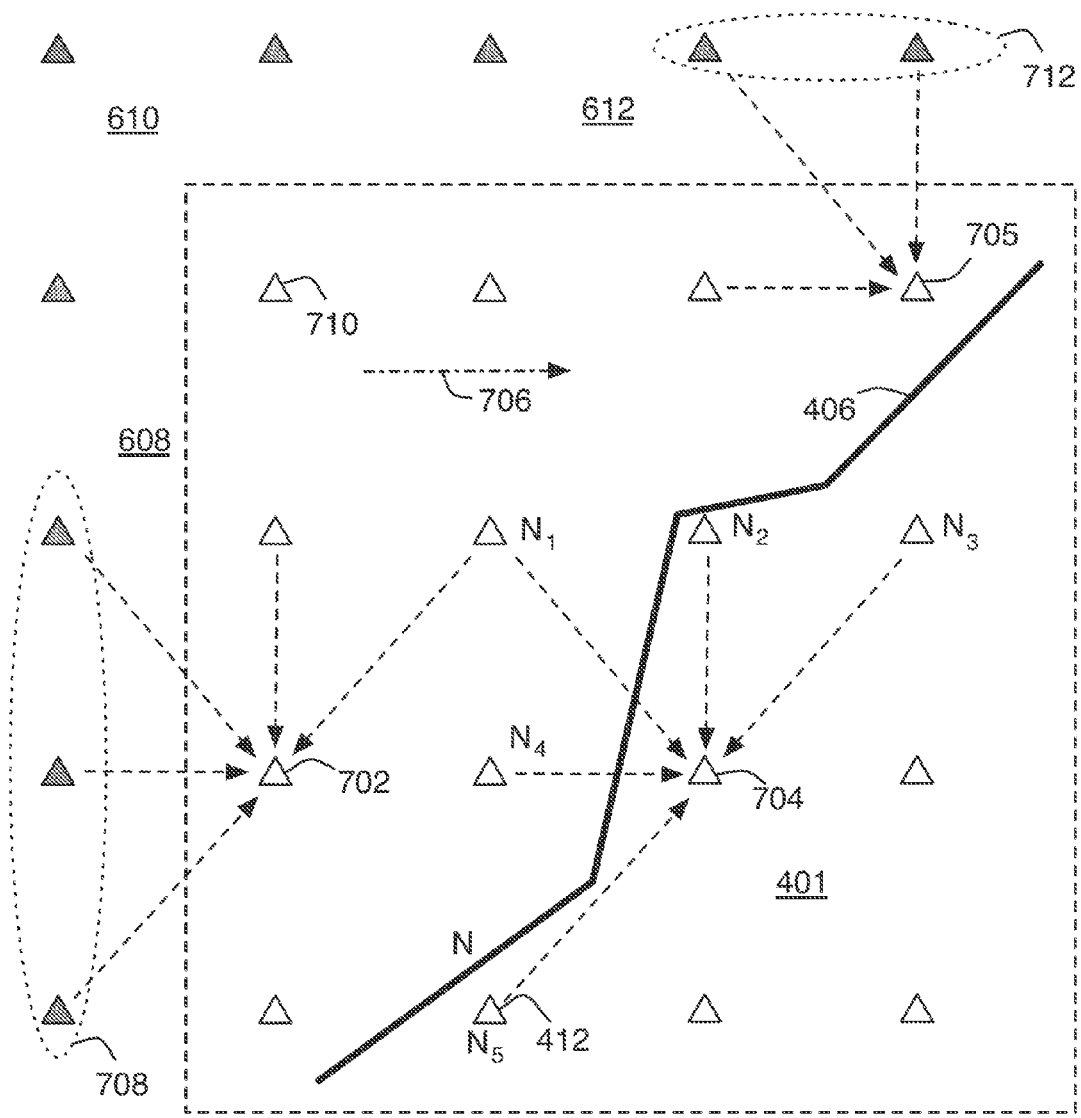
FIG. 7 is a diagram illustrating an example intra prediction scheme.

FIG. 7 illustrates example intra prediction scheme 700 for PU 401 when undertaking processing for adaptively predicting chroma values at block 504. Scheme 700 illustrates adaptive chroma prediction for three example chroma pixel positions 702, 704 and 705. In the example of scheme 700, where an example top-down, left-to-right raster scan order 706 is implemented, a chroma value may be predicted for position 702 at block 504 based, at least in part, on a local analysis of available neighboring reconstructed luma values. Because raster scan order 706 involves scan processing chroma pixel positions of PU 401 in a top-down, left-to-right manner starting with a position 710 at the upper left hand corner of PU 401, the availability of neighboring reconstructed chroma values may depend upon location within PU 401. For instance, for position 702, five neighboring chroma pixel positions (including three positions 708 in neighboring PU 608) have reconstructed luma values available and hence local analysis (indicated by dashed arrows in FIG. 7) may be limited to these neighboring positions. In contrast, for position 705, only three neighboring chroma pixel positions (including two positions 712 in neighboring PU 612) have reconstructed luma values available and hence local analysis may be limited to these neighboring positions.

In various implementations, local analysis of reconstructed luma values of neighboring positions may involve determining which neighboring reconstructed luma value is closest in value to the reconstructed luma value of the chroma pixel position that is to have its chroma value predicted at block 504. For instance, for a chroma pixel position P, a set of neighboring or adjacent chroma pixel positions $S = \{N_i | i=1, 2, \ldots K\}$ may be defined, where $N_i$ represent the adjacent chroma positions. In various implementations, the neighboring chroma positions $N_i$ may be in neighboring PUs and/or may be inside the current PU. If L(K) represent the down-sampled reconstructed luma value of chroma position k, and $\acute{C}$(K) represents the reconstructed chroma value of position k, the chroma value predicted for chroma position P may be determined by $$\begin{cases} k = \arg\min_{i=1-K} |L(P) - L(N_i)| \\ \acute{C}(P) = \acute{C}(N_k) \end{cases} \quad (4)$$

If a value $L(N_i)$ is not available for a given neighboring position $N_i$ then that position may not be considered in applying Eq. (3). For example, for chroma pixel position 704, Eq. (4) may be applied at block 504 to reconstructed luma values of the neighboring positions labeled $N_1, N_2, N_3$ and $N_4$ where the position labeled $N_5$ would not be included in the local analysis because a reconstructed chroma value will not have been generated for that position yet. In this example, the result of applying local analysis for chroma position 704, where edge 406 passes between neighboring chroma positions, may result in a determination that one of the reconstructed luma values of positions $N_2$ and $N_3$ are closest in value to the reconstructed luma value of position 704 as positions $N_2$ and $N_3$ lie on the same side of edge 406 as position 704 while positions $N_1$ and $N_4$ lie on the other side of edge 406.

Figure 8:
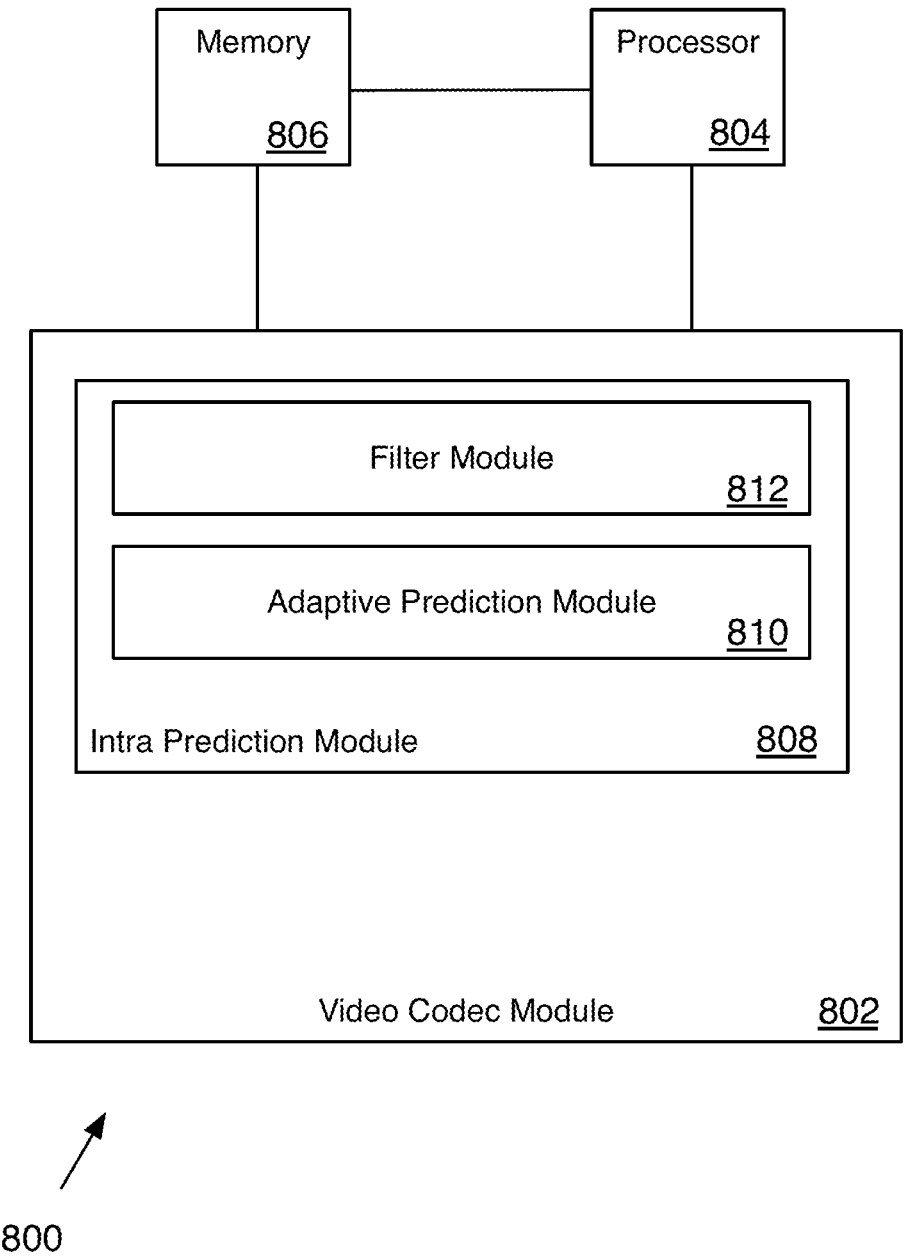
FIG. 8 is an illustration of an example system.

FIG. 8 illustrates an example system 800 in accordance with the present disclosure. System 800 may be used to perform some or all of the various functions discussed herein and may include any device or collection of devices capable of undertaking luma-based chroma intra prediction processing in accordance with the present disclosure. For example, system 800 may include selected components of a computing platform or device such as a desktop, mobile or tablet computer, a smart phone, a set top box, etc., although the present disclosure is not limited in this regard.

System 800 may include a video codec module 802 operably coupled to a processor 804 and memory 806. Decoder module 802 may include an intra prediction module 808. Intra prediction module 808 may include an adaptive prediction module 810 and a filter module 812 and may be configured to undertake, in conjunction with processor 804 and/or memory 806, any of the processes described herein and/or any equivalent processes. In various implementations, referring to the example decoder 200 of FIG. 2, intra prediction module 808 may be provided by intra prediction module 202. Codec module 802 may include additional components, such as an inverse quantization module, inverse transform module and so forth, not depicted in FIG. 8 in the interest of clarity. Processor 804 may be a SoC or microprocessor or Central Processing Unit (CPU). In other implementations, processor 1004 may be an Application Specific Integrated Circuit (ASIC), a Field Programmable Gate Array (FPGA), a digital signal processor (DSP), or other integrated formats.

Processor 804 and module 802 may be configured to communicate with each other and with memory 806 by any suitable means, such as, for example, by wired connections or wireless connections. Moreover, system 800 may implement encoder 100 of FIG. 1. Further, system 800 may include additional components and/or devices such as communications circuitry, etc. that have not been depicted in FIG. 8 in the interests of clarity.

While FIG. 8 depicts codec module 802 separately from processor 804, those skilled in the art will recognize that codec module 802 may be implemented in any combination of hardware, software, and/or firmware and that, therefore, codec module 802 may be implemented, at least in part, by software logic stored in memory 806 and/or as instructions executed by processor 804. For instance, codec module 802 may be provided to system 800 as instructions stored on a machine-readable medium. In some implementations, codec module 802 may include instructions stored in internal memory (not shown) of processor.

Memory 806 may store reconstructed chroma or luma pixel values, down-sample filter coefficients and so forth as described herein. For example, down-sample filter coefficients stored in memory 806 may be loaded into memory 806 in response to filter module 812 specifying the filter coefficients as described herein. Thus, in various implementations, specific components of system 800 may undertake one or more of the blocks of example processes 300 and 500 of FIGS. 3 and 5, respectively, as described herein. For example, filter module 812 may undertake block 502 of process 500, while adaptive prediction module 810 may undertake block 504, and so forth.

Figure 9:
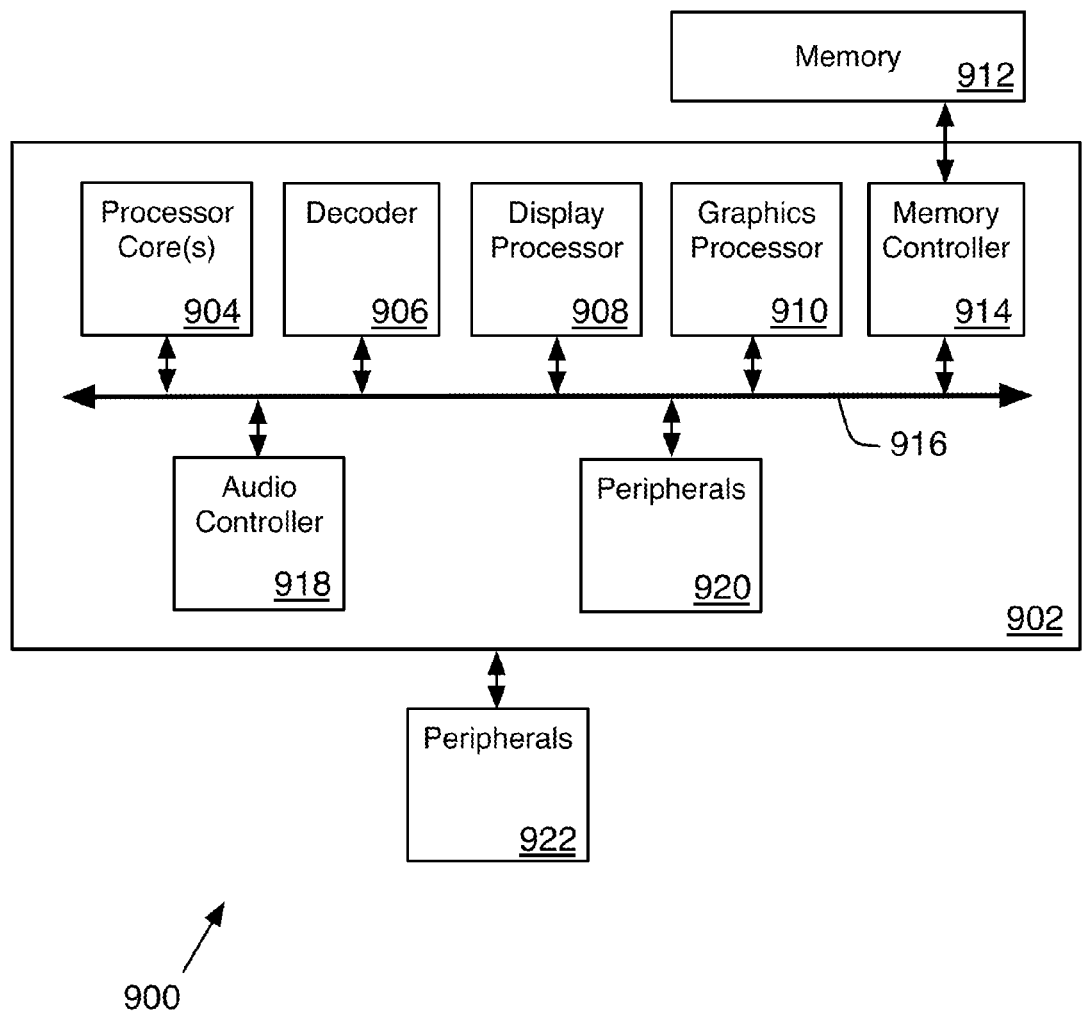
FIG. 9 is an illustration of an example system, all arranged in accordance with at least some implementations of the present disclosure.

FIG. 9 illustrates an example system 900 in accordance with the present disclosure. System 900 may be used to perform some or all of the various functions discussed herein and may include any device or collection of devices capable of undertaking luma-based chroma intra prediction in accordance with various implementations of the present disclosure. For example, system 900 may include selected components of a computing platform or device such as a desktop, mobile or tablet computer, a smart phone, etc., although the present disclosure is not limited in this regard. In some implementations, system 900 may be a computing platform or SoC based on Intel® architecture (IA). It will be readily appreciated by one of skill in the art that the implementations described herein can be used with alternative processing systems without departure from the scope of the present disclosure.

System 900 includes a processor 902 having one or more processor cores 904. Processor cores 904 may be any type of processor logic capable at least in part of executing software and/or processing data signals. In various examples, processor cores 904 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor or microcontroller. While not illustrated in FIG. 9 in the interest of clarity, processor 902 may be coupled to one or more co-processors (on-chip or otherwise). Thus, in various implementations, other processor cores (not shown) may be configured to undertake luma-based chroma intra prediction in conjunction with processor 902 in accordance with the present disclosure.

Processor 902 also includes a decoder 906 that may be used for decoding instructions received by, e.g., a display processor 908 and/or a graphics processor 910, into control signals and/or microcode entry points. While illustrated in system 900 as components distinct from core(s) 904, those of skill in the art may recognize that one or more of core(s) 904 may implement decoder 906, display processor 908 and/or graphics processor 910. In some implementations, core(s) 904 may be configured to undertake any of the processes described herein including the example processes described with respect to FIGS. 3 and 5. Further, in response to control signals and/or microcode entry points, core(s) 904, decoder 906, display processor 908 and/or graphics processor 910 may perform corresponding operations.

Processing core(s) 904, decoder 906, display processor 908 and/or graphics processor 910 may be communicatively and/or operably coupled through a system interconnect 916 with each other and/or with various other system devices, which may include but are not limited to, for example, a memory controller 914, an audio controller 918 and/or peripherals 920. Peripherals 920 may include, for example, a unified serial bus (USB) host port, a Peripheral Component Interconnect (PCI) Express port, a Serial Peripheral Interface (SPI) interface, an expansion bus, and/or other peripherals. While FIG. 9 illustrates memory controller 914 as being coupled to decoder 906 and the processors 908 and 910 by interconnect 916, in various implementations, memory controller 914 may be directly coupled to decoder 906, display processor 908 and/or graphics processor 910.

In some implementations, system 900 may communicate with various I/O devices not shown in FIG. 9 via an I/O bus (also not shown). Such I/O devices may include but are not limited to, for example, a universal asynchronous receiver/transmitter (UART) device, a USB device, an I/O expansion interface or other I/O devices. In various implementations, system 900 may represent at least portions of a system for undertaking mobile, network and/or wireless communications.

System 900 may further include memory 912. Memory 912 may be one or more discrete memory components such as a dynamic random access memory (DRAM) device, a static random access memory (SRAM) device, flash memory device, or other memory devices. While FIG. 9 illustrates memory 912 as being external to processor 902, in various implementations, memory 912 may be internal to processor 902. Memory 912 may store instructions and/or data represented by data signals that may be executed by the processor 902. In some implementations, memory 912 may store down-sample filter coefficients and the like.

The systems described above, and the processing performed by them as described herein, may be implemented in hardware, firmware, or software, or any combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed is:

1. A computer-implemented method, comprising:
at a video encoder,
determining, for a chroma pixel position in a current prediction unit (PU) of an image frame, a textural characteristic of a plurality of luma pixel positions physically adjacent to the chroma pixel position in the image frame;
specifying at least one down-sample filter in response to the textural characteristic; and
providing information specifying the down-sample filter; and
at a video decoder,
determining reconstructed luma values for a first plurality of chroma pixel positions of a current prediction unit (PU) in response to luma values of a plurality of luma pixel positions of the current PU; and
predicting a chroma value of a first chroma pixel position of the first plurality of chroma pixel positions in response to at least one of a reconstructed luma value of the first chroma pixel position or luma values of a second plurality of chroma pixel positions located adjacent to the first chroma pixel position, wherein the second plurality of chroma pixel positions includes at least some of the first plurality of chroma pixel positions.

2. The method of claim 1, wherein predicting the chroma value of the first chroma pixel position in response to luma values of the second plurality of chroma pixel positions comprises:
identifying a second chroma position having a reconstructed luma value closest in value to the reconstructed luma value of the first chroma pixel position by comparing the reconstructed luma value of the first chroma pixel position to the reconstructed luma values of the second plurality of chroma pixel positions, wherein the second plurality of chroma pixel positions includes the second chroma pixel position.

3. The method of claim 2, wherein the chroma value of the first chroma pixel comprises a chroma value of the second chroma pixel position.

4. The method of claim 1, wherein predicting the chroma value of the first chroma pixel position in response to the reconstructed luma value of the first chroma pixel position comprises applying at least one of a linear transform or a non-linear transform to the reconstructed luma value of the first chroma pixel position.

5. The method of claim 4, further comprising:
determining one or more parameters of the linear transform or the non-linear transform in response to at least one of reconstructed chroma values of the second plurality of chroma pixel positions or reconstructed luma values of the second plurality of chroma pixel positions.

6. The method of claim 5, wherein determining the one or more parameters of the linear transform or the non-linear transform comprises determining at least one of a linear least squares value, a non-linear least squares value, or a weighted least squares value of the reconstructed chroma values and/or reconstructed luma values of the second plurality of chroma pixel positions.

7. The method of claim 1, wherein determining reconstructed luma values for the plurality of chroma pixel positions of the current PU in the response to luma values of the plurality of luma pixel positions of the current PU comprises applying a down-sample filter to the luma values of the plurality of luma pixel positions.

8. The method of claim 1, wherein the plurality of luma pixel positions comprise luma pixel positions in at least one of the current PU or a previously predicted PU adjacent to the current PU.

9. The method of claim 1, wherein the current PU comprises a portion of an intra coded image having one of a YUV 4:2:0 format or YUV 4:2:2 format.

10. A computer-implemented method, comprising:
at a video encoder,
determining, for a chroma pixel position in a current prediction unit (PU) of an image frame, a textural characteristic of a plurality of luma pixel positions physically adjacent to the chroma pixel position in the image frame;
specifying at least one down-sample filter in response to the textural characteristic; and
providing information specifying the down-sample filter.

11. The method of claim 10, further comprising:
determining filter coefficients associated with the down-sample filter; and
providing the filter coefficients with the information specifying the down-sample filter.

12. The method of claim 10, wherein specifying at least one down-sample filter comprises selecting the down-sample filter from a predetermined plurality of down-sample filters.

13. The method of claim 10, wherein determining the textural characteristic comprises performing edge detection based on luma values of the plurality of luma pixel positions.

14. The method of claim 13, wherein the down-sample filter comprises a 1×2 down-sample filter or a 2×1 down-sample filter if an edge is detected adjacent to the chroma pixel position, and wherein the down-sample filter comprises a 3×2 down-sample filter or a 3×3 down-sample filter if an edge is not detected adjacent to the chroma pixel position.

15. The method of claim 10, wherein the image frame comprises an intra coded frame having one of a YUV 4:2:0 format or YUV 4:2:2 format.

16. The method of claim 10, wherein providing information specifying the down-sample filter comprises specifying the down-sample filter in at least one header of a bitstream.

17. The method of claim 10, wherein the plurality of luma pixel positions physically adjacent to the chroma pixel position comprise at least one of luma pixel positions of the current PU or of a PU adjacent to the current PU.

18. A system, comprising:
a video encoder comprising:
an intra prediction module configured to:
determine, for a chroma pixel position in a current prediction unit (PU) of an image frame, a textural characteristic of a plurality of luma pixel positions physically adjacent to the chroma pixel position in the image frame;
specify at least one down-sample filter in response to the textural characteristic; and
provide information specifying the down-sample filter; and
a video decoder comprising:
an intra prediction module configured to:
determine reconstructed luma values for a first plurality of chroma pixel positions of a current prediction unit (PU) in response to luma values of a plurality of luma pixel positions of the current PU; and
predict a chroma value of a first chroma pixel position of the first plurality of chroma pixel positions in response to at least one of a reconstructed luma value of the first chroma pixel position or luma values of a second plurality of chroma pixel positions located adjacent to the first chroma pixel position, wherein the second plurality of chroma pixel positions includes at least some of the first plurality of chroma pixel positions.

19. The system of claim 18, wherein the intra prediction module is configured to predict the chroma value of the first chroma pixel position in response to luma values of the second plurality of chroma pixel positions by identifying a second chroma position having a reconstructed luma value closest in value to the reconstructed luma value of the first chroma pixel position by comparing the reconstructed luma value of the first chroma pixel position to the reconstructed luma values of the second plurality of chroma pixel positions, wherein the second plurality of chroma pixel positions includes the second chroma pixel position.

20. The system of claim 19, wherein the chroma value of the first chroma pixel comprises a chroma value of the second chroma pixel position.

21. The system of claim 18, wherein the intra prediction module is configured to predict the chroma value of the first chroma pixel position in response to the reconstructed luma value of the first chroma pixel position by applying at least one of a linear transform or a non-linear transform to the reconstructed luma value of the first chroma pixel position.

22. The system of claim 21, wherein the intra prediction module is further configured to:
determine one or more parameters of the linear transform or the non-linear transform in response to at least one of reconstructed chroma values of the second plurality of chroma pixel positions or reconstructed luma values of the second plurality of chroma pixel positions.

23. The system of claim 22, wherein the intra prediction module is configured to determine the one or more parameters of the linear transform or the non- linear transform by determining at least one of a linear least squares value, a non-linear least squares value, or a weighted least squares value of the reconstructed chroma values and/or reconstructed luma values of the second plurality of chroma pixel positions.

24. The system of claim 18, wherein the intra prediction module is configured to determine reconstructed luma values for the plurality of chroma pixel positions of the current PU in the response to luma values of the plurality of luma pixel positions of the current PU by applying a down-sample filter to the luma values of the plurality of luma pixel positions.

25. A video encoder, comprising:
an intra prediction module configured to:
determine, for a chroma pixel position in a current prediction unit (PU) of an image frame, a textural characteristic of a plurality of luma pixel positions physically adjacent to the chroma pixel position in the image frame;
specify at least one down-sample filter in response to the textural characteristic; and
provide information specifying the down-sample filter.

26. The video encoder of claim 25, wherein the intra prediction module is further configured to:
determine filter coefficients associated with the down-sample filter; and
provide the filter coefficients with the information specifying the down-sample filter.

27. The video encoder of claim 25, wherein the intra prediction module is configured to determine the textural characteristic by performing edge detection based on luma values of the plurality of luma pixel positions.

28. The video encoder of claim 27, wherein the down-sample filter comprises a 1×2 down-sample filter or a 2×1 down-sample filter if an edge is detected adjacent to the chroma pixel position, and wherein the down-sample filter comprises a 3×2 down-sample filter or a 3×3 down-sample filter if an edge is not detected adjacent to the chroma pixel position.

29. The video encoder of claim 25, wherein the intra prediction module is configured to provide information specifying the down-sample filter by specifying the down- sample filter in at least one header of a bitstream.

30. A non-transitory article comprising a computer program product having stored therein instructions that, if executed, result in:
at a video encoder,
determining, for a chroma pixel position in a current prediction unit (PU) of an image frame, a textural characteristic of a plurality of luma pixel positions physically adjacent to the chroma pixel position in the image frame;
specifying at least one down-sample filter in response to the textural characteristic; and
providing information specifying the down-sample filter; and
at a video decoder,
determining reconstructed luma values for a first plurality of chroma pixel positions of a current prediction unit (PU) in response to luma values of a plurality of luma pixel positions of the current PU; and
predicting a chroma value of a first chroma pixel position of the first plurality of chroma pixel positions in response to at least one of a reconstructed luma value of the first chroma pixel position or luma values of a second plurality of chroma pixel positions located adjacent to the first chroma pixel position, wherein the second plurality of chroma pixel positions includes at least some of the first plurality of chroma pixel positions.

31. The article of claim 30, wherein predicting the chroma value of the first chroma pixel position in response to luma values of the second plurality of chroma pixel positions comprises:

identifying a second chroma position having a reconstructed luma value closest in value to the reconstructed luma value of the first chroma pixel position by comparing the reconstructed luma value of the first chroma pixel position to the reconstructed luma values of the second plurality of chroma pixel positions, wherein the second plurality of chroma pixel positions includes the second chroma pixel position.

32. The article of claim 31, wherein the chroma value of the first chroma pixel comprises a chroma value of the second chroma pixel position.

33. The article of claim 30, wherein predicting the chroma value of the first chroma pixel position in response to the reconstructed luma value of the first chroma pixel position comprises applying at least one of a linear transform or a non-linear transform to the reconstructed luma value of the first chroma pixel position.

34. The article of claim 33, further comprising instructions that, if executed, result in:

determining one or more parameters of the linear transform or the non-linear transform in response to at least one of reconstructed chroma values of the second plurality of chroma pixel positions or reconstructed luma values of the second plurality of chroma pixel positions.

35. The article of claim 34, wherein determining the one or more parameters of the linear transform or the non-linear transform comprises determining at least one of a linear least squares value, a non-linear least squares value, or a weighted least squares value of the reconstructed chroma values and/or reconstructed luma values of the second plurality of chroma pixel positions.

36. The article of claim 30, wherein determining reconstructed luma values for the plurality of chroma pixel positions of the current PU in the response to luma values of the plurality of luma pixel positions of the current PU comprises applying a down-sample filter to the luma values of the plurality of luma pixel positions.

* * * * *

UNITED STATES PATENT AND TRADEMARK OFFICE
CERTIFICATE OF CORRECTION

PATENT NO. : 8,724,711 B2
APPLICATION NO. : 13/512992
DATED : May 13, 2014
INVENTOR(S) : Lidong Xu et al.

It is certified that error appears in the above-identified patent and that said Letters Patent is hereby corrected as shown below:

On the title page, item (57), under "Abstract", in column 2, line 2, delete "ultra" and insert -- intra --, therefor.

Signed and Sealed this
Fifth Day of August, 2014

Michelle K. Lee
*Deputy Director of the United States Patent and Trademark Office*